April 21, 1942.                J. R. ALBURGER                2,280,737
                     REVERSIBLE MOTION PICTURE CAMERA
                         Filed June 26, 1940
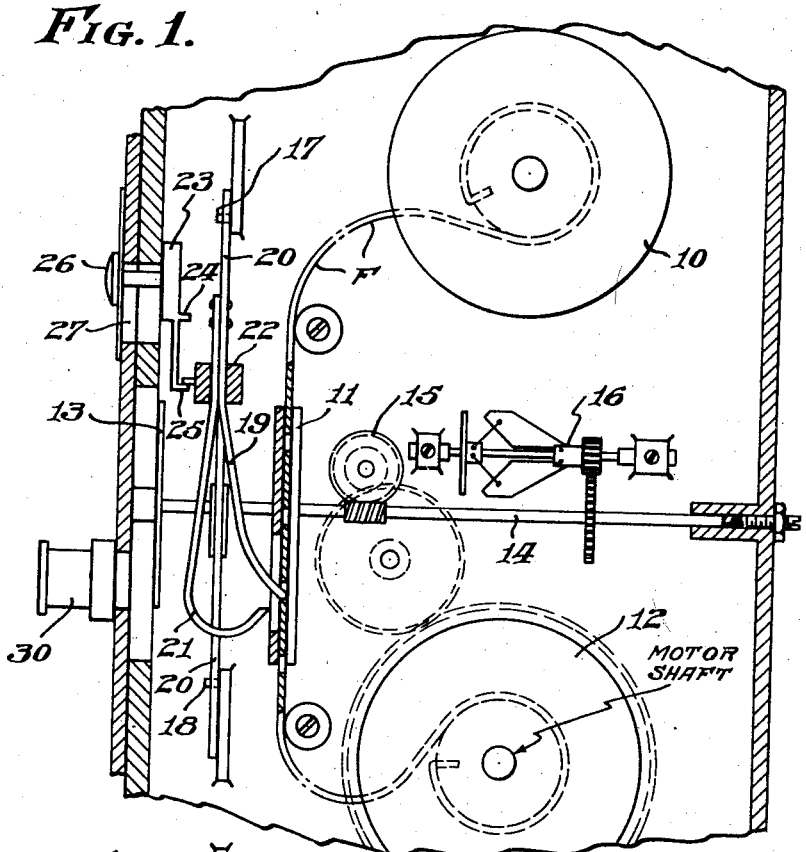
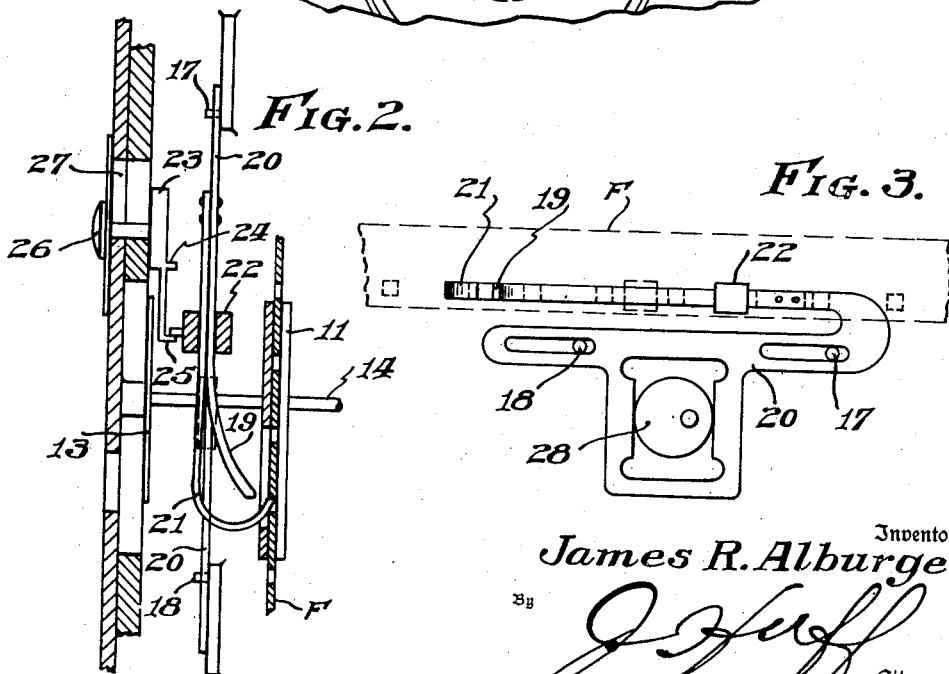
James R. Alburger, Inventor
Attorney Patented Apr. 21, 1942

2,280,737

UNITED STATES PATENT OFFICE 2,280,737

REVERSIBLE MOTION PICTURE CAMERA

James R. Alburger, Merion, Pa., assignor to Radio Corporation of America, a corporation of Delaware Application June 26, 1940, Serial No. 342,410

2 Claims. (Cl. 88—18.4)

This invention relates to an improved motion picture camera mechanism and more particularly to a reversible intermittent feed mechanism for use in small motion picture cameras.

In some types of small motion picture cameras, particularly those of the 8 mm. variety, the mechanism is not reversible. In many of these devices, the reversal of the direction of operation of the mechanism would not reverse the direction of film motion due to the fact that a spring claw intermittent feed is used for advancing the film intermittently past the taking aperture. On the other hand, many cameras of this type are not provided with film feeding sprockets so that to reverse the direction of film motion for the distance necessary to accomplish a lap dissolve or similar effect it is only necessary to reverse the direction of operation of the intermittent feed. Reversal of the direction of rotation of the actuating mechanism claw feed does not, as pointed out above, reverse the direction of film motion, and I have accordingly devised a type of claw feed in which the reversal of direction of film motion may be readily accomplished.

In my improved intermittent feed mechanism one claw is provided which normally feeds the film in the usual direction and a second claw is provided which may be brought into operation while simultaneously removing the first claw from operation for feeding the film in the opposite direction.

One object of this invention is to provide a reversible motion picture camera.

Another object of the invention is to provide an improved reversible film feed mechanism.

Another object of the invention is to provide a film feed mechanism which may be reversed without stopping the camera.

Another object of the invention is to provide film feed claw mechanism which may be used to feed film in either of two directions.

Other and incidental objects of the invention will be apparent to those skilled in the art from a reading of the following specification and an inspection of the accompanying drawing, in which—

Figure 1 is a view of a camera incorporating the improved intermittent feed mechanism as taken from the operating side of the camera and showing the claw feed in normal film feed position, Figure 2 is a partial view corresponding with Fig. 1 and showing the claw feed in position for reverse feed of the film, and Figure 3 is a view of the claw taken from the right side of Fig. 1.

Referring to Fig. 1, the film as usual passes from the reel 10 through the gate 11 to the take-up reel 12, the shaft of which is driven. Light coming through the lens 30 is interrupted by the shutter 13 at appropriate intervals. The shutter 13 is carried on a shaft 14 which is driven by a gear 15 connected to the motor of the camera. The shaft 14 also drives the governor 16 which controls the speed of the apparatus.

The film F is normally fed downwardly by the spring claw 19 which is formed integral with a member 20 carried on the pins 17 and 18. This spring claw is reciprocated vertically by the cam 28 shown in Fig. 3. It will be apparent that the claw 19 pushes the film downwardly by engaging one of the sprocket holes and when the claw is lifted it rides on the surface of the film until engaging the next sprocket hole when the following downward movement again pushes the film down the distance between the sprocket holes. Mounted on the member 20 there is provided the additional claw 21 which is shaped as shown to engage the film in the opposite direction from the claw 19. Surrounding the claws 19 and 21 there is provided a slidable member 22 which may be in the form of an apertured block or a U-shaped clip bent around the two spring claws. This member 22 is provided with an extension adapted to contact the stops 24 and 25 on the movable member 23. The member 23 is connected to a button 26 which may be manually moved in the slot 27. When the member 23 is in the upper position shown in Fig. 1 the extension on the member 22 reaches the stop 25 at its lower position and reciprocates freely betwen the stops 24 and 25 during operation of the intermittent feed mechanism.

Referring to Fig. 2: When the button 26 is moved to the lower position, the stops 24 and 25 are similarly moved downwardly the distance necessary for the member 22 to move to disengage the claw 19 and engage the claw 21 with the film. In this position likewise the extension on the member 22 reciprocates between the stops 24 and 25 but the member 22 can not move to its upper position shown in Fig. 1 due to the stop 24. It will be apparent that in the position shown in Fig. 2 movement of the member 20 will cause the claw 21 to move the film upwardly one film for each reciprocation of the claw and the claw 19 will be ineffective. The fact that the lower reel 12 is driven does not interfere with the operation of the claw 21 as a friction drive is always used on the reel 12 and the power available in the claw 21 is sufficient to overcome this friction. The fact that the upper reel 10 is not driven and therefore does not serve as a take-up reel during reverse operation is immaterial as the reverse operation is only used for a few inches of film at most and this amount of film may be permitted to pile up loosely around the reel 10.

It will be apparent that the distance between the stops 24 and 25 must correspond with the amount of movement of the member 20 so that the member 22 may reciprocate freely between the stops and without being moved at each end of the stroke. The length of the slot 27 is determined by the distance between the uppermost position of the member 22 in relation to the claws as shown in Fig. 1 and the lower position necessary to completely disengage the claw 19 and to engage the claw 21.

Having now described my invention, I claim:

1. Intermittent feed mechanism including a movable plate having a spring claw thereon for moving film in one direction, a second claw on said plate for moving film in the opposite direction, means carried by said plate and cooperating with said claws for selectively retracting either of said claws, and means normally stationary relative to said plate for controlling said means.

2. Intermittent feed mechanism including a movable plate having a spring claw thereon for moving film in one direction, a second claw on said plate for moving film in the opposite direction, means carried by said plate and cooperating with said claws for selectively retracting either of said claws, and movable means normally stationary relative to said plate for controlling said means.

JAMES R. ALBURGER.